J. M. Ferguson,
Stump Elevator.
No. 107,891.    Patented Oct. 4, 1870.
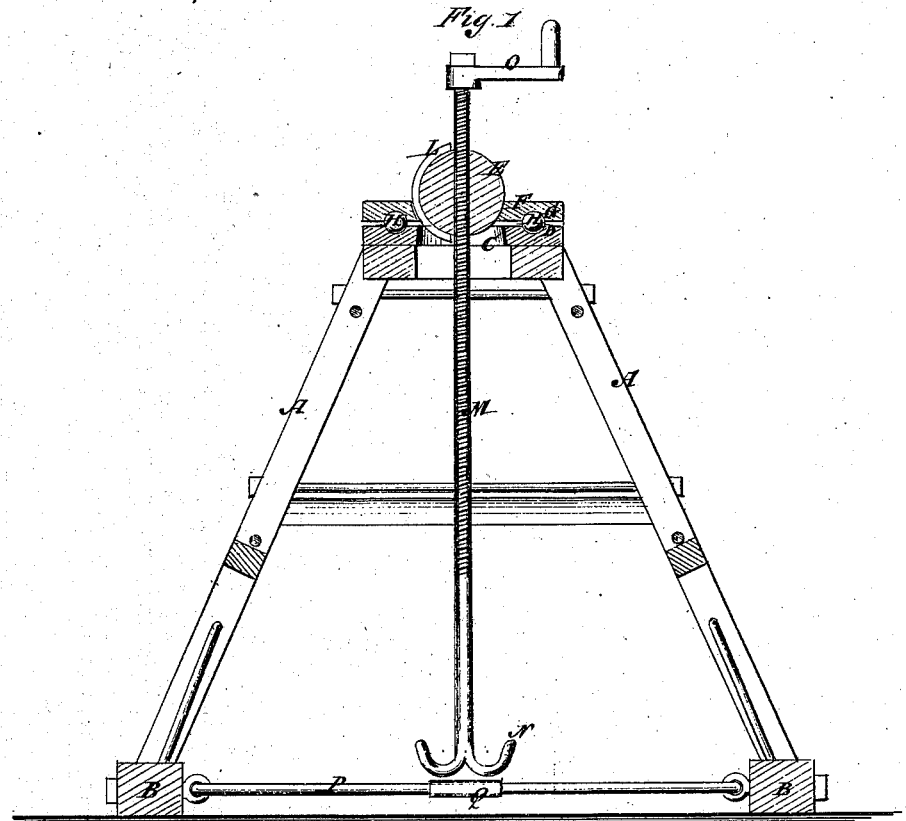
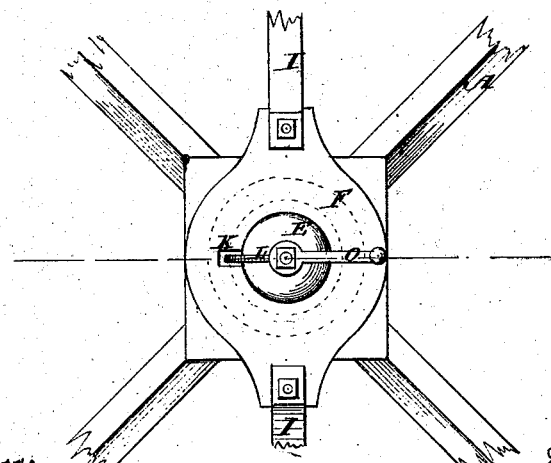

United States Patent Office.

JAMES M. FERGUSON, OF SUMMIT, MISSISSIPPI.

Letters Patent No. 107,891, dated October 4, 1870.

IMPROVEMENT IN STUMP-PULLERS.

The Schedule referred to in these Letters Patent and making part of the same

*To all whom it may concern:*

Be it known that I, JAMES M. FERGUSON, of Summit, in the county of Pike and State of Mississippi, have invented a new and improved Stump-Puller; and I do hereby declare that the following is a full, clear, and exact description thereof, which will enable others skilled in the art to make and use the same, reference being had to the accompanying drawing forming part of this specification.

This invention relates to improvements in machines for pulling stumps, and consists in an arrangement on the top of a portable frame of a spherical nut with a pulling screw-rod working in it, the said nut being mounted in a rotating sweep to be turned for raising the screw-rod, and to have a universal motion in its seat in the sweep, so that the rod may shift according to the direction of the strain on it, and the sweep being mounted on friction-balls for being supported and for revolving readily.

The invention also comprises an arrangement of the brace-rods for the base of the frame, calculated to facilitate the adjustment of the frame around the stumps.

Figure 1 is a sectional elevation of my improved stump-pulling apparatus, and

Figure 2 is a top view of a part of the same.

Similar letters of reference indicate corresponding parts.

A represents a frame, preferably made broad at the base, so that the top can be supported over the top of a stump while the legs rest on two sills or beams, B, which may be curved upward at the ends, so that they will slide along the ground and admit of the machine being drawn from place to place.

The top of this frame has a large circular opening in it at C, and a small circular groove, D, around the said opening.

E is a large spherical nut resting in a concave seat in the center of a horizontal revolving-plate, F, also having a large central hole coinciding with the hole C, and a circular groove, G, coinciding with groove D, and resting on balls, H, in the said grooves.

This plate is provided with sweeps I, for turning it by horse or other power.

The plate F has a notch, K, and the nut a flange, L, which projects into the said notch and causes the nut to be revolved by the plate, while allowing it to oscillate vertically in its seat.

M is the pulling screw-rod, screwing vertically through the nut.

It is provided with hooks, N, at the bottom for attaching the chain, and a crank, O, at the top for turning it by hand to take up the slack of the chain after hitching to the stump, so that it may be done quicker than by the sweeps. It is also used to turn the screw back for slacking up the chain to unhitch, for releasing the stump. The rod can be turned until the chain is twisted up so as to prevent it.

The tie or brace-rods P, which connect the two base-beams B, are made in two parts and connected by the right-and-left screw-threaded sleeves Q, or by other suitable means, for the purpose of opening them, to facilitate placing the machine over the stump.

The rod M is raised after the stump is hitched on by power applied to the sweeps, carrying the nut around, while the said rod is prevented from turning by the chain when twisted as much as it will. This arrangement of the nut to have a universal motion is particularly advantageous in pulling stumps on account of the frequent changes which occur in the direction of the strain on the rod as the different roots are broken. These changes in the direction of the strain would bend the screwed rod if not allowed to shift according to the strain.

The nut and screw constitute a very powerful machine, which may be operated with but little force on the sweeps.

Having thus described my invention,

I claim as new and desire to secure by Letters Patent—

1. The combination of the nut E, rotating plate F, balls H, supporting-plate D, and screw-rod M, arranged to operate substantially as shown and described.

2. The screw-rod M, crank O, spherical nut E, flange L, ring-plates F and D, notch K, balls H, frame A, base-beams B, brace-rods P, and sleeves Q, all constructed and arranged as and for the purpose set forth.

JAMES M. FERGUSON.

Witnesses:
D. H. GARLAND,
T. R. STOCKDALE.